United States Patent [19]

Rainis

[11] Patent Number: 4,902,666

[45] Date of Patent: Feb. 20, 1990

[54] PROCESS FOR THE MANUFACTURE OF SPHEROIDAL BODIES BY SELECTIVE AGGLOMERATION

[75] Inventor: Andrew Rainis, Walnut Creek, Calif.

[73] Assignee: Chevron Research Company, San Francisco, Calif.

[21] Appl. No.: 142,892

[22] Filed: Jan. 11, 1988

Related U.S. Application Data

[62] Division of Ser. No. 881,156, Jul. 2, 1986, Pat. No. 4,737,478.

[51] Int. Cl.$^4$ .............................................. B01J 35/08
[52] U.S. Cl. ..................................... 502/439; 502/8;
502/60; 502/232; 502/355; 502/407; 502/415;
502/527; 423/328; 423/335; 423/625
[58] Field of Search ............... 423/625, 626, 627, 628,
423/335, 328; 502/8, 527, 60, 415, 407, 232,
355, 439

[56] References Cited

U.S. PATENT DOCUMENTS

| | | | |
|---|---|---|---|
| 2,666,749 | 1/1954 | Hoekstra | 423/628 |
| 3,296,151 | 1/1967 | Heinze et al. | 502/8 |
| 3,857,780 | 12/1974 | Gustafson | 502/527 |
| 4,124,535 | 11/1978 | Farrington | 502/8 |
| 4,159,969 | 7/1979 | Moné et al. | 423/625 |
| 4,599,321 | 7/1986 | Rainis | 502/8 |

FOREIGN PATENT DOCUMENTS

| | | |
|---|---|---|
| 5744 | 1/1972 | Japan . |
| 61-256921 | 11/1986 | Japan . |
| 62-167206 | 7/1987 | Japan . |

*Primary Examiner*—Robert L. Stoll
*Attorney, Agent, or Firm*—T. G. De Jonghe; V. J. Cavalieri

[57] ABSTRACT

This invention relates to the preparation of small spheroidal solid agglomerates. More particularly, the process produces strong solid spheroidal agglomerates containing alumina or a mixture of alumina and at least one other inorganic material, which process comprises:

(a) mixing at high speed a portion of alumina or a mixture of alumina and at least one other inorganic material in the form of hydrophilic mircon-sized particles in a water-immiscible liquid thereby forming a dispersion;

(b) gradually adding to the dispersion an aqueous acidic phase while continuing the high-speed mixing until substantially spherical micro-agglomerates form within the water-immiscible liquid;

(c) subjecting the micro-agglomerates to agitation in a vessel having a hydrophobic inner surface at a speed low enough to achieve substantially uniformly sized spheroidal agglomerates;

(d) drying the agglomerates to produce hardened spheroidal uniformly sized agglomerates; and (e) optionally further separating the agglomerates by size. Optionally, the aqueous phase in step (b) may include the soluble salts of catalytic metals, and bases and/or colloidal-sized inorganic particles. These spheroidal particles can have either smooth surfaces or polylobe surfaces depending on the conditions of preparation. They have diameters generally between 1 to 5 mm and are useful as catalysts, or catalyst supports. Catalytic components may subsequently be deposited on the support.

8 Claims, 2 Drawing Sheets

PROCESS FOR THE MANUFACTURE OF SPHEROIDAL BODIES BY SELECTIVE AGGLOMERATION

This is a division of application Ser. No. 881,156, filed 7/2/86, now U.S. Pat. No. 4,737,478.

FIELD OF THE INVENTION

This invention relates to the field of small spheroidal solid body or particle preparation. More particularly, it concerns a process for forming spheroidal solid bodies useful as adsorbents, catalysts and catalyst supports useful in chemical processes, via agglomeration of a suspension of solid particles. This process produces substantially spherical or spheroidal bodies or particles having a small substantially uniform diameter in a specified range.

BACKGROUND OF THE INVENTION

Related Art

A wide variety of solid inorganic bodies is prepared in the chemical process and related industries. The spherical or spheroidal shape is useful for such bodies because of its desirable properties, such as better packing, higher strength, less "fine" particles, and better flow characteristics, to name a few. These spherical or spheroidal bodies find application primarily as catalysts, or as supports for catalysts, or as adsorbents and the like.

A number of processes are known to form solid inorganic bodies. For instance, in U.S. Pat. No. 3,656,901, Kummerle discloses that silica-alumina and silica particles are gelled by adding drops of aqueous colloidal sodium silicate or colloidal silica alumina to a solvent, such as an alcohol, ether-alcohol or amine. However, this patent does not disclose a method of obtaining substantially spherical particles having a diameter in a specified range.

In U.S. Pat. No. 3,844,978, Hickson discloses a process wherein hydrothermal crystallization is conducted using an aqueous slurry of hydrous sols and salts. The slurry is subsequently dewatered and dried to give solids which are then ground to a desired size. This patent does not teach the formation of small substantially spherical or spheroidal agglomerates.

In U.S. patent application Ser. No. 524,197, filed Aug. 18, 1983, Hickson describes a method wherein micron-sized particles are dispersed in a non-aqueous medium and agglomerated by the addition of an aqueous phase in the presence of colloidal particles to give a plastic mass which is then extruded or otherwise formed into particulate bodies.

In U.S. Pat. No. 3,258,311, Burzynski et al disclose a process for the formation of uniformly small spherical beads from alkali metal-silicates. The method comprises the steps of (1) combining the particle-forming ingredients comprising: (a) water; (b) a compound of the general formula $xR_2O \cdot ySiO_2$ where R is an alkali metal and the x/y ratio is greater than 0.24 (an x/y ratio of $R_2O/SiO_2$ which characterizes the water soluble sodium silicates, and also generally the other water soluble alkali silicates); (c) dilute strong aqueous acid; and (d) an emulsifying agent; and (2) agitating the resulting mixture. The beads are usually about 1 micron to 1.5 millimeters in diameter. This process is disadvantageous because when it is used to make beads larger than 1.5 mm, they are not uniform in size.

In U.S. Pat. No. 3,140,251, Plank et al disclose the formation of spheroids by dispersing an aluminosilicate in a hydrosol, which is obtained by reacting an alkali metal silicate with an acid or an alkaline coagulant. The hydrosol may be dispersed through a nozzle into a bath of oil or other water-immiscible suspending medium to obtain spheroidally shaped bead particles of catalyst. However, the uniformly small size of the agglomerate cannot be controlled, and with high agitation the colloidal solution would form an emulsion.

In U.S. Pat. No. 3,296,151, Heinze et al disclose a process in which solid zeolite particles are wetted with water, mixed with a binder and kneaded into a paste which is extruded or otherwise shaped and dried. Heinze et al also disclose other agglomeration processes, including a process in which an aqueous sol is dripped into a water-immiscible liquid where the sol gels as it falls through a column of liquid. In both cases, spherical zeolite molecular sieves are produced, which have an undisclosed diameter or range of sizes.

In U.S. Pat. No. 3,515,684, McEvoy discloses the formation of fluidizable cracking catalyst particles. A dispersion of finely divided plastic particles of kaolin in water are intensely agitated in an oil to agglomerate the particles to provide a size distribution of the order of 15 to 150 microns in diameter suitable for catalysts for fluidized cracking. A disadvantage of this process appears to be that it is limited to producing particles having a diameter of 15 to 150 microns.

In U.S. Pat. No. 4,013,587, Fischer et al disclose a process for preparing alumina-containing particles which comprise the steps of: (a) mixing an aluminum hydroxide hydrosol with a high molecular weight natural organic material to form a mixture; (b) introducing the mixture in dispersed form into a water-immiscible liquid to form gel particles at elevated temperatures; (c) aging the particles in the liquid and then in aqueous ammonia; (d) recovering the particles; and (e) calcining the particles. The disadvantages of this process include the use of elevated temperatures, and use of aqueous ammonia which can be hazardous.

In U.S. Pat. No. 2,474,911, Pierce et al teach the preparation of micro-spherical gel particles in a continuous manner. A sol is introduced into a water-immiscible liquid such as an oil containing an emulsifier. The zone of turbulence is only at the bottom of a mixing column and the flow rate of the oil in the column is maintained to achieve continuous flow of the gel droplets. Pierce et al do not teach the obtaining of spherical particles having a diameter of 1-5 mm.

A few additional U.S. Patents are of interest. In U.S. Pat. No. 2,384,946, Marisic discloses the formation of generally spherical hydrogel pellets. The pellets are obtained by spraying the hydrogel through an orifice into a gaseous or liquid medium.

U.S. Pat. No. 2,900,349, Schwartz discloses the preparation of inorganic oxide gels which have high resistance to attrition. In one embodiment, Schwartz describes the preparation of hydrogel spheroids by allowing the gel to fall or rise slowly through a column of hydrocarbon solvent.

In U.S. Pat. No. 3,004,929, Lucas et al disclose a process for the preparation and extrusion of silica-alumina catalyst supports. The catalyst supports obtained are usually pellets which are not uniformly spherical or in the size range described in the present invention.

In Australian Patent No. 127,250, Kimerlin et al disclose the production of finely divided gel particles which may be employed for catalytic adsorption and other purposes. The size is reported to be controlled by preparing inorganic gels in minute particles by emulsifying a hydrosol as the internal phase of a water-immiscible liquid, agitating the emulsion to prevent separation of the phases until the hydrosol is set and separating the gel particles. The disadvantage of this process is that the particles are of the order of 60-100 microns and thus are much smaller than the particles described herein.

Tauster, in the I Journal of Catalysis, Vol. 18, No. 3, pp. 358-3680 (198), discloses a process for impregnating the pores of particles with a metal salt by suspending them in a water-immiscible liquid, such as a hydrocarbon, and titrating the liquid with an aqueous solution of metal salt.

C. E. Capes, in "Agglomeration in Liquid Media" in the text Particle Size Enlargement, published by Elsevier Scientific Publishing Company, Amsterdam, The Netherlands, 1980, reviews a variety of applications of water-immiscible media in particle-forming processes. However, none of the processes disclosed by Capes, describes the steps or spheroidal product having a uniform diameter of about 1 to 5 mm as described herein.

In the *Canadian Journal of Chemical Engineering*, Vol. 47, pp. 166-170 (1969), A. F. Sirianni et al discuss a number of processes whereby finely divided solids in liquid suspension are agglomerated. The solids obtained may be separated as spherical bodies without regard t a substantially uniform size.

Additional sources of background information on agglomeration include "Agglomeration: Growing Larger in Applications and Technology" by J. E. Browning in *Chemical Engineering*, pp. 147-170 (Dec. 4, 1967); H. M. Smith and I. E. Puddington, *Can. J. Chem. Eng.*, Vol. 38, 1916 (1960); J. R. Farrand, *Can. J. Chem. Eng.*, Vol. 39, 94 (1961); and J. P. Sutherland, Can. J. Chem. Eng., Vol. 40, 268 (1962).

All of the art processes described hereinabove are not without some shortcomings. For one, it is often difficult to vary the composition and size of the solid body. Further, the products of these processes are often fine powders or chips having mechanical properties which may be unacceptable under the conditions of use. The present invention provides a method for forming small substantially spherical or spheroidal solid inorganic bodies which are particularly useful as catalysts and catalyst supports. The spherical or spheroidal shape provides additional strength, reduces breakage, improves packing, and the like. These spheroidal-shaped agglomerates have an average uniform diameter of greater than 0.5 mm, preferably between about 1 to 5 mm, and most preferably from 2 to 5 mm.

The present invention is an improvement over the agglomeration method claimed in U.S. application Ser. No. 691,645 filed Jan. 15, 1985 with respect to making agglomerates which contain alumina. The present agglomeration method is carried out using alumina alone or alumina in combination with other inorganic materials, and in the presence of an aqueous solution which contains an acidic material. The agglomerates prepared by the present method have an increased crush strength and depending on the strength of the acidic material used, the agglomerates may have an increased surface area to volume ratio overagglomerates prepared in the absence of acidic material.

SUMMARY OF THE INVENTION

In one embodiment, the present invention concerns a process for producing solid substantially uniformly sized spheroidal agglomerates of alumina or a mixture of alumina and at least one other substantially inorganic material. More specifically, the invention is directed to a process for producing solid substantially spherical agglomerates containing alumina which comprises:

(a) mixing at high speed a portion of alumina or a mixture of alumina and at least one other inorganic material in the form of hydrophilic micron-sized particles in a water-immiscible liquid thereby forming a dispersion;

(b) gradually adding to the dispersion an aqueous acidic phase while continuing high-speed mixing until spheroidal micro-agglomerates form within the water-immiscible phase;

(c) then subjecting the micro-agglomerates to agitation at a mixing speed low enough to achieve substantially uniformly sized spheroidal agglomerates;

(d) separating the agglomerates obtained from the water-immiscible solvent; and (e) drying the agglomerates to produce hardened substantially spherical uniformly sized agglomerates. Optionally, the process may also incorporate in step (b) in the aqueous phase, colloidal-sized inorganic particles, and/or about 0.1 to 70% by weight of a soluble metal salt, in which case the metal salt is incorporated into the agglomerates.

Another embodiment of the present invention is directed to the spheroidal agglomerates of uniform size formed by the above-mentioned process. More specifically, this embodiment is directed to a solid, spheroidal and uniformly sized agglomerate of alumina having a diameter of greater than 0.5 mm, preferably from 1 to 5 mm and most preferably from 1 mm to 2 mm or from 2 to 5 mm depending on its end use. The agglomerates of alumina may also contain other substantially inorganic materials. These latter agglomerates contain at least 10% by weight of alumina and preferably at least 25% by weight of alumina. An aspect of this embodiment is a spheroidal polylobe agglomerate of uniform size which comprise closely packed contiguous substantially spherical alumina agglomerates or agglomerates of a mixture of alumina and at least one other inorganic solid, said closely packed contiguous substantially spherical agglomerate ranging from about 0.2 mm or less in diameter and preferably from about 0.05 mm to 0.2 mm in diameter, and wherein the spheroidal polylobe agglomerate has an overall particle size diameter of 0.5 mm or greater, preferably 1 mm to 5 mm and most preferably from 1 mm to 2 mm or 2 mm to 5 mm depending on its end use. The agglomerates contain at least 10% by weight alumina and preferably at least 25% by weight.

The spheroidal agglomerates are useful as catalysts, catalyst supports or bases, absorbents, and the like. The spheroidal polylobe agglomerates by virtue of their high surface area/volume ratio are particularly useful in those reactions which tend to be diffusion controlled such as residuum hydroprocessing. The agglomerates having an overall particle size diameter of from about 1 mm to 2 mm are most useful as catalysts or catalyst base materials for residuum hydroprocessing and those having diameters of from about 2 mm to 5 mm and greater are useful as absorbents.

DEFINITIONS

As used herein:

"Agglomerate" or "agglomeration" refers to a product (or a technique) that combines micron sized particles to form larger particles which are held together by a variety of physical-chemical forces. For the purposes of this invention, the terms spheroidal and substantially spherical are synonymous.

"Water-immiscible liquid" refers to liquids such as hydrocarbons, fluorocarbons, halocarbons and mixtures thereof, which are soluble in water to an extent of not greater than about 1.0% by weight. Preferred water-immiscible liquids for use herein have a boiling point between about 35° C. and 100° C. The liquids do not dissolve or otherwise harm the hydrophobic materials lining the mixers or tubing of particular sections of the apparatus used in this invention.

"Hydrocarbon" or "hydrocarbon liquid" refers to a liquid hydrocarbon having a boiling point (bp) of about 35° to 100° C. It includes, for example, pentane, pentene, hexane, hexene, cyclohexane, heptane, heptene, petroleum ether of bp 30° to 60° C., petroleum ether of bp 50° to 80° C., petroleum distillate fractions of between about 50° to 100° C., and the like. Hydrocarbon includes straight, branched and cyclic structures of these compounds and mixtures thereof.

"Fluorocarbon" refers to the group of commercially available liquid straight, branched or cyclic aliphatic compounds wherein one or more of the protons have been replaced by fluorine. Usually an additional one or more protons has been replaced by chlorine or bromine. These liquids include for example, bromofluoromethane, 1,2-dichlorohexafluorocyclobutane, 1,1,2-trichloro-1,2,2-trifluoroethane, 1-bromo-1,2-dichloro-1,2,2-trifluoroethane, 1-fluoro-1,2,2-trichloroethane and the like. The boiling points of these liquids range from bout 35° C. to 100° C. Because of diminished hydrogen bonding, removal of these liquids from the agglomerates is more easily accomplished by heating than with hydrocarbon liquids.

"Halocarbon" refers to liquids such as straight, branched or cyclic aliphatic compounds wherein one or more of the protons have been replaced by a chlorine or bromine atom. These liquids include methylene chloride chloroform, carbon tetrachloride, ethylene dichloride, bromochloromethane, and the like. The boiling points of these liquids range from about 35° C. to 100° C.

"Zeolite" includes natural and synthetic materials of hydrous, tectosilicate minerals characterized by having an aluminosilicate tetrahedral framework, controlled porosity, ion-exchangeable large cations, and loosely held water molecules permitting reversible dehydration. Examples of hydrated aluminum and calcium silicates include $CaO \cdot 2Al_2O_3 \cdot 5SiO_2$ or $Na_2O \cdot 2Al_2O_3 \cdot 5SiO_2$. Some water of hydration is usually present. These materials are extremely useful alone or with a catalyst support in refining and reforming of petroleum. Zeolite includes, but is not limited to, the natural zeolites, such as erionite, chabazite, active analcites, gmelenite and mordenite, and includes as well the multitude of synthetic or modified crystalline zeolites such as are referred to in the trade as ZSM-11 described in U.S. Pat. No. 3,709,979; ZSM-5 and ZSM-8 described in U.S. Pat. No. 3,755,145; zeolites A, X, Y, L, D, R, S, T described in U.S. Pat. No. 3,013,990 and patents cited therein, CZH-5 zeolite as described in U.S. Pat. No. 4,360,419; ZSM-43 as described in U.S. Pat. No. 4,209,499; ZSM-34 as described in U.S. Pat. No. 4,086,186; and ZSM-39 as described in U.S. Pat. No. 4,287,166. These zeolites are intended to be descriptive, and the patents listed above are incorporated herein by reference.

DETAILED DESCRIPTION OF THE PREFERRED EMBODIMENTS OF THE INVENTION

Figure 1:
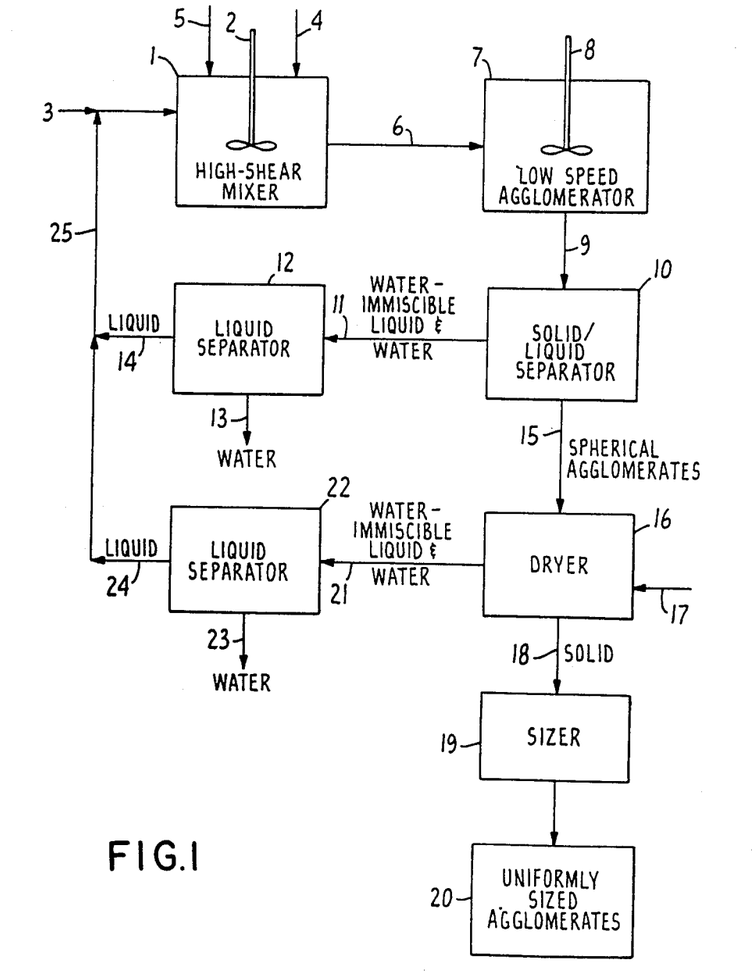
FIG. 1 is a schematic representation of the various operations of mixing, dispersing, agglomerating, separating, drying and recycling of solvent in accordance with the present invention.

Referring now to FIG. 1, vessel 1, usually a high-speed mixer, [preferably a colloid mill (CHARLOTTE)], such as is manufactured by Chemicolloid Laboratories, Inc. of 55 Herricks Road, Garden City, New York 11040] is used for the high-speed/high-shear mixing to perform the required dispersion of the particles, emulsification of the aqueous phase and formation of micro-agglomerates. Vessel 1 is fitted with a high-speed stirring means (e.g., stirrer) 2, or may have equivalent means of achieving the necessary high-shear mixing. Other high-speed mixers (dispersers) in the art include those manufactured by Myers Engineering, Inc., 8376 Salt Lake Avenue, Bell, California 90201, and homogenizer mixers by Greerco Corporation, Executive Drive, Hudson, New Hampshire 03051.

In a preferred embodiment for the continuous production of spheroidal catalysts and/or adsorbents, mixing vessel 1 is a high-shear mixer, such as colloid mill. The speed of the mixer is usually between about 2500 and 4000 revolutions per minute (rpm), preferably about 2800 to 3000 rpm so as to produce a dispersion of microagglomerates. The shear speed (or edge speed) can be calculated for these stirrers by knowing the diameters of the stirrers or mixers. Thus, for a stirrer having a 6-inch blade, about 2500 to 4000 rpm corresponds to an edge speed of about 66.6 to 10.66 feet per second, and 2800 to 3000 rpm corresponds to about 74.6 to 80 feet per second.

The water-immiscible liquid from line 3 (makeup liquid) and line 25 (recycle liquid) is fed continuously into vessel 1. The water-immiscible liquid may include hydrocarbons, fluorocarbons and halocarbons as are defined herein. Preferred liquids include the fluorocarbons, specifically the fluoroalkanes and fluorohaloalkanes having a boiling point of about 35° to 100° C. The fluorinated liquids have an added advantage because of their high specific gravity. The agglomerates float on the surface and are easily removed from the liquid by surface scooping and the like. Also, the high vapor pressure of the fluorocarbons and the lack of hydrogen bonding facilitate the removal of the solvent during the drying process. 1,1,2-Trichloro-1,2,2-trifluoroethane and/or 1,2-dibromo-1,1,2,2-tetrafluoroethane is particularly useful as a liquid medium.

The alumina and optionally any other inorganic materials, such as hydrophilic micron-sized particles, and the aqueous acidic phase are also fed continuously and simultaneously into vessel 1 through lines 5 and 4. The high-shear mixer produces micro-agglomerates comprising the alumina or mixture of alumina and at least one other inorganic material and the aqueous acidic phase. Residence times of the micro-agglomerates in vessel 1 are usually between about 0.1 and 300 seconds, depending upon the materials involved. Desirably, the micro-agglomerates at this stage are less than 200 microns (0.2 mm) in diameter and preferably from about 0.05 mm to 0.2 mm. Inorganic salts or reagents may be added to the aqueous phase to enhance the catalytic activity of the finished product, e.g., salts of Pt, Pd, Ni, Co, Mo, Sn, W, Rh, Re and the like. Alternatively, colloidal-sized inorganic particles can also be mixed with the aqueous phase and also fed into vessel 1. In this manner, an intimate mixture of inorganic catalyst components (alumina, silica, zeolites), catalytic metals and chemical modifiers is produced by the high-shear mixing.

The relative quantities of water-immiscible liquid, alumina alone or in combination with at least one other hydrophilic micron-sized inorganic particle, colloidal-sized inorganic particles, and aqueous acidic solution are those sufficient to obtain the described agglomeration. The alumina or mixture of alumina and at least one other hydrophilic micron-sized inorganic particles are usually of the order of about 1 to 25 percent by weight in the water-immiscible liquid. The colloidalsized inorganic particles may range up to about 30% by weight and preferably from about 5% to 30% by weight of alumina or mixture of alumina and at least one other hydrophilic micron-sized inorganic particles, in the agglomerate.

In a continuous process, the dispersion of micro-agglomerates is then conveyed by line 6 to vessel 7. Vessel 7, a low-speed mixer, is usually baffled. It contains a stirrer 8, or equivalent means, to mix the particles at a speed sufficiently low that the particles will grow or agglomerate to form spheroidal agglomerates of a substantially uniform size of about 1 to 5 mm in diameter, preferably about 1 mm to 2 mm or 2 to 5 mm in diameter depending on its end use. In a preferred embodiment, line 6, vessel 7, and stirrer 8 are lined or coated with a hydrophobic material. These materials usually take the form of a hydrophobic plastic, such as polyalkenes (i.e., polyethylene, polypropylene, polystyrene, polyvinylchloride, polycarbonates, poly(methylmethacrylate), TEFLON, VITON®, etc. Polyethylene and TEFLON are particularly preferred materials. Attempts to perform the present agglomeration in a glass or metal (i.e., stainless steel) mixing vessel results in the inorganic agglomerate "smearing" over the inner surface of the mixing vessel causing plugging and other operational difficulties.

Mixer 8 of low-speed agglomerator 7 has a speed of about 250 to 2000 rpm, preferably about 1000 to 2000 rpm. The residence time of the dispersion in this low-speed agglomerator may be from about 1 minute to 30 minutes, depending upon the desired final properties of the agglomerates. A residence time of about 5 to 10 minutes is preferred to form the agglomerates described herein. Generally speaking, higher speeds of 1000 to 2000 rpm and lower residence times (less than about 5 minute) during the agglomeration in vessel 7 will produce smaller agglomerates, of the order of 1 to 3 mm in diameter. Generally, lower speeds of the order of 250 to 1000 rpm and longer residence times will produce larger agglomerates of the order of 3 to 5 mm in diameter.

Alternatively in batch processing, the function of vessel 1 and vessel 7 may be combined in one vessel having hydrophobic inner surfaces, as described above, such that the speed is varied from high to low over time to achieve substantially the same result as is obtained with the two vessels. Also, in batch processing all reagents and liquids can be added sequentially and in any order to the same vessel to obtain substantially the same result as with the two vessels in the continuous process described above. The agglomerates after the low-speed agglomeration, whether continuous or batch, are next conveyed to the solid-liquid separator 10 via line 9. It is preferred that the line 9 and the separator (or screen) have hydrophobic surface as is described above. The agglomerates then do not smear and are not destroyed on the separator.

After the separation of the agglomerates from the water-immiscible liquid in separator 10, the separated water-immiscible liquid (or solvent) and any residual water are conveyed through line 11 to the water/liquid separation vessel 12. The aqueous solution containing the acidic material is removed via line 13 and the water-immiscible liquid is conveyed through lines 14 and 25 to be recycled into vessel 1. This liquid may be dried to meet the requirements for moisture for reuse in the agglomeration process.

The separated spheroidal agglomerates (which are usually about 1 to 5 mm or larger in diameter, but preferably are from about 2 to 5 mm and most preferably 1 to 2 mm, depending upon the agglomeration conditions and the desired end use of the agglomerate) with most of the solvent removed are then conveyed via line 15 to a dryer 16. The dryer is usually an industrial belt dryer but equivalent means may be used. Line 17 is optionally available to provide a source of air or inert gas through the dryer to facilitate the removal of the solvent and water. The dried spheroidal agglomerates are then conveyed using line 18 to a sizer 19 which separates the dried agglomerates into narrower size ranges, if necessary. Useful size ranges are between about 1 to 5 mm, preferably about 2 to 5 mm and most preferably from about 1 to 2 mm. The agglomerates are collected and may be calcined at elevated temperatures to remove additional volatile materials and to further harden them before use as catalysts or catalyst supports.

In a similar manner to the separation described above, the separated water-immiscible liquid and aqueous solution containing the acidic material are transmitted through line 21 to the liquid separator vessel 22. The aqueous solution is removed via line 23 and the water-immiscible liquid is conveyed through lines 24 and 25 to be recycled into vessel 1. This liquid may be dried to meet the requirements for moisture for reuse in the agglomeration process.

PREFERRED EMBODIMENTS

Embodiments of the present invention include the preparation of spheroidal agglomerates wherein, after drying, the agglomerates have a generally uniform diameter of about 1 to 5 mm, preferably from 1 mm to 2 mm or from 2 to 5 mm depending on end use. An additional subgroup of embodiments includes the preparation of those agglomerates which comprise alumina as a single material, or a mixture of alumina and at least one other inorganic material such as molecular sieves, e.g., zeolites, crystalline microporous silicates, aluminophosphates, and silica-aluminophosphates, amorphous aluminosilicates, oxides of Ti, Zr, Mg, Sn, Sr, Ge, B and the like, and mixtures thereof, and the like, and preferably mixtures of zeolite and/or silica in combination with alumina. The colloidal sized inorganic particles may comprise these same inorganic materials. These component materials may be subsequently impregnated by metals and the like, by methods known in the art to produce active catalysts.

Preferred embodiments of the preparation of single component alumina agglomerates include the process where the high-speed mixing is between about 2500 and 4000 rpm, and also where the low-speed mixing is between about 1000 to 2000 rpm. For a batch process, these two speeds may occur sequentially in the same vessel.

An additional preferred embodiment of the preparation of single component alumina agglomerates is where the water-immiscible liquid is a fluorocarbon solvent, particularly 1,1,2-trichloro-1,2,2-trifluoroethane.

Additional embodiments of the present invention include forming spheroidal agglomerates of alumina in mixture with at least one other micron-sized inorganic material, wherein after removal of the agglomerates from the separator (separator 10 of FIG. 1), the diameter of the uncured agglomerates is about 2 to 5 mm and preferably 2 to 4 mm.

An additional embodiment of the present invention includes forming spheroidal agglomerates of at least two components, such as micron-sized particles of alumina and colloidal-sized particles of silica or zeolite.

An additional embodiment includes forming two or more component agglomerates where the high-speed mixing is between about 2500 and 4000 rpm, and the low-speed mixing is between about 1000 to 2000 rpm. For the two-component agglomerates containing alumina, an additional preferred embodiment of the process is the use of a fluorocarbon as a water-immiscible liquid (or solvent), specifically 1,1,2-trichloro-1,2,2-trifluoroethane.

In the practice of the preferred embodiment of the present invention, the alumina or mixture of alumina and at least one other inorganic material, such as a micron-sized zeolite or silica or mixture thereof, are first suspended in the water-immiscible liquid with stirring and then agglomerated by gradually adding an aqueous acidic phase which may optionally include colloidal or subcolloidal size particles and soluble metal salts. Also, once the solid spheroidal products have been formed, art-known methods, such as impregnation, vapor deposition or the like, may be employed to deposit additional materials in or on the solid bodies.

The relative amounts of alumina or mixture of alumina and at least one other hydrated non-colloidal (micron-sized) particles such as silica, zeolite or mixtures thereof may be controlled. The exact ratio of the two types of particles will depend in part on the product being produced. Usually, there is at least 10% by weight of alumina present in the agglomerate.

The acidic materials which are added to the aqueous solutions in the method of this invention include both inorganic and organic acids.

While use of an acidic material increases the strength of the agglomerate formed, the shape and pore structure of the agglomerate may also be affected by the strength of the acidic material used. While not being held to theory, it appears that the alumina which is present in the agglomerate is peptized by the acid present in the aqueous solution, i.e., the alumina is broken down into smaller particles by the acid.

The initial step in the agglomeration process is the formation of micro-agglomerates of peptized alumina or mixture of peptized alumina and at least one other inorganic material which micro-agglomerates are in the order of 0.2 mm or less in diameter and preferably 0.05 to 0.2 mm in diameter. The micro-agglomerates then combine to give compact structures which retain the substantially spherical shapes of the micro-agglomerates, i.e., they display spherical lobes which have the dimensions of the micro-agglomerates.

Depending on the degree of peptization of the alumina, the overall structure of the agglomerate, which has a diameter in the order of 0.5 mm or greater, preferably about 1 mm to 5 mm and most preferably from about 1 mm to 2 mm and 2 mm to 5 mm depending on its end use, will generally continue to retain the original structure or shape of the combined micro-agglomerates, or the overall structure can be changed to a substantially spherically smooth shape. The degree of peptization of the alumina for the most part is a function of acid strength and concentration.

Use of strong acids in the agglomeration process tend to yield spheroidal agglomerates with relatively smooth surfaces, whereas relatively weaker acids tend to give spheroidal agglomerates with irregular or polylobular shaped surfaces.

Figure 2:
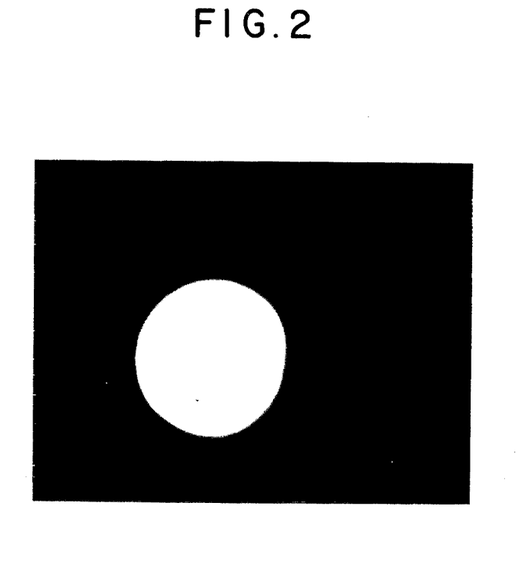
FIGS. 2(a) and 2(b) are optical microscope photographs of the spheroidal agglomerates prepared according to the method of the present invention.
Figure 3:
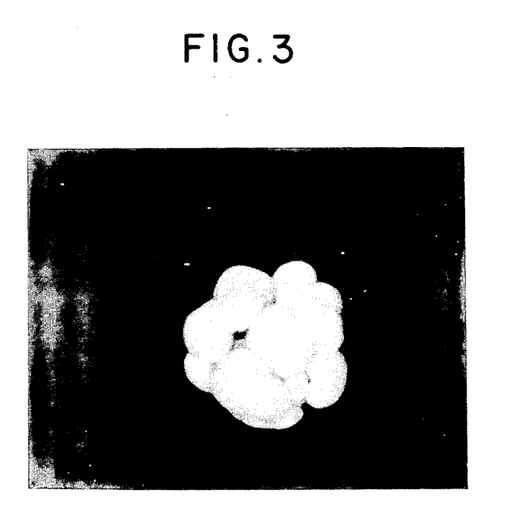

FIGS. 2(a) and 2(b) show an optical microscope photograph of the spheroidal agglomerates prepared according to the method of this invention. FIG. 2(a) represents a spheroidal agglomerate prepared from alumina and using trifluoroacetic acid, a relatively strong acid (Example 4 hereinbelow), and FIG. 2(b) represents a spheroidal agglomerate prepared from alumina and using trichloroacetic acid, a weaker acid (Example 6 hereinbelow).

The lobes which are present in the spheroidal agglomerate of FIG. 2(b) are substantially solid sections that project from the bulk of the agglomerate and each has a diameter of about 0.2 mm or less and preferably from about 0.05 to 0.2 mm.

As mentioned hereinabove, peptization refers to the ability to break down particles of alumina to a smaller size by treatment with an acidic reagent. For such use, any water-soluble acidic compound, organic or inorganic, but preferably inorganic, that can impart to said aqueous solution, a pH below 6 can be used. Specific examples of such water-soluble acidic materials that can be used include inorganic acids, such as nitric acid, sulfuric acid, hydrofluoric acid, hydrochloric acid, phosphoric acid and boric acid and the like, organic acids, such as trifluoroacetic acid, trichloroacetic acid, oxalic acid, citric acid, tartaric acid and formic acid and the like, may be used. The most effective acids appear to be monobasic, with the strong mineral acids, such as nitric and hydrochloric being the best peptizing agents.

Peptization is used to control the pore structure and to improve the strength of the finished agglomerate. Peptization is thus a critical factor in the preparation of the agglomerates. In the making of spheroidal, irregular or polylobular shaped agglomerates, acid peptization is particularly important since this imparts the needed strength to the agglomerate.

The concentration of acidic material relative to the amount of alumina ranges about 1.0 to 0.1 moles of acid per 100 grams of alumina. Generally, the stronger the acid, the better the peptizing agent and the lesser the amount of acid required, relative to a weaker acid.

The pKa's of several acids are given in Table 1 below.

TABLE 1

| Acid | pKa (Acid Strength) |
|---|---|
| $CF_3COOH$ | 0.0 |
| $CCl_3COOH$ | 0.9 |
| $HNO_3$ | −1.4 |
| $CH_3COOH$ | 5 |

Based on acid strength, it would be expected that the degree of peptization decreases in the following way:

$$HNO_3 > CF_3COOH > CCl_3COOH > CH_3COOH$$

For example, it has been found that $HNO_3$ and $CF_3COOH$ give spheroidal smooth shaped agglomerates, whereas $CCl_3COOH$ and $CH_3COOH$ give spheroidal polylobe shaped agglomerates.

While generally, acidic materials having a pKa of less than about 0.9 produce smooth spheroidal shaped agglomerates, other factors which should also be taken into consideration with respect to obtaining a predictable shape for the agglomerate include the presence of other types of inorganic base material used, acid concentration and to a lesser extent, the degree and length of time of mixing.

With respect to agglomerate shape, it has been observed that agglomerates prepared in the presence of relatively weak acids and possessing the spheroidal polylobe shape are surprisingly insensitive to agglomeration time The major change is a shift to larger agglomerate size rather than a shift to a smoother spheroidal shape.

This invention is further described by the following Examples which are provided to illustrate the invention and are not to be construed as limiting the invention's scope.

EXAMPLES

Example 1

Spherical Agglomerate of Zeolite-Alumina (a) Ultra-Stable Y-Zeolite powder (particle size less than 10 microns) is dispersed in 1000 ml of 1,1,2-trichloro-1,2,2-trifluoroethane using a POLYTRON (Brinkman Instruments, Model PT 10/35) high-speed mixer. The reaction vessel is a 2L polypropylene container. Catapal Alumina, (particle size 43% less than 45 microns, 15% less than 90 microns) is added and dispersed uniformly with the zeolite. A dilute aqueous solution of nitric acid (0.1 molar) is slowly added dropwise to the dispersion until micro-agglomerates are formed. The speed of the POLYTRON mixer is about 3000 rpm. The predetermined solid portion is about 53% of the total solid plus water and nitric acid, with 10 weight percent zeolite and 90 weight percent Catapal. The reaction mixture is transferred to the low-speed mixer and container, in which all exposed inner surfaces are of polypropylene, and stirred for 4 minutes at a speed of 600 rpm to obtain substantially spherical uniformly sized small agglomerates. The agglomerates are separated from the solvent and have a diameter of about 1 to 3 mm.

The particles are then dried (dryer 16) for 4 hours at 400° F. before calcining for 1 hour at 1000° F. in dry air. The dried agglomerate particles of 1 to 3 mm in diameter obtained are sized using standard sieves, and readily withstand additional ion-exchange conditions with potassium solutions and impregnation processing steps to provide the small, spheroidal smooth agglomerates which are useful as catalysts.

(b) 1,1,2-Trichloro-1,2,2-trifluoroethane may be substituted by other water-immiscible liquids in this preparation. Therefore, proceeding as described in Subpart (a) above of this Example but substituting a volumetrically equivalent amount of pentane; pentene; cyclohexane; hexane; heptane; heptene; octane; pentane/heptane (50/50 by volume); petroleum ether, bp 30°-60° C.; petroleum ether, bp 50°-80° C.; methylene chloride; chloroform; ethylene dichloride; 1,2-dibromo-1,1,2,2-tetrafluoroethane; 1-bromo-1,2-dichloro-1,2,2-difluorohexane; pentane/chloroform (50/50 by volume); or octane/1,1,2-trichloro-1,2,2-trifluoroethane (50/50 by volume) or mixtures thereof for 1,1,2-trichloro-1,2,2-trifluoroethane, there are obtained the corresponding small, substantially spherical smooth agglomerates of zeolite/alumina, which when dried are useful as catalysts.

(c) The Ultra-Stable Y-Zeolite powder (micronsized particles) in the above procedure may be substituted by other inorganic micron-sized materials. Therefore, proceeding as is described in Subpart (a) above of this Example, but substituting a stoichiometrically equivalent amount of Zeolite A; Zeolite D; Zeolite R; Zeolite S; Zeolite T; Zeolite X; Zeolite L; ZSM-5; ZSM-8; ZSM-11; ZSM-43; ZSM-34; ZSM-39; CZH-5; $SiO_2$; $TiO_2$; $ZrO_2$; or mixtures thereof for Ultra-Stable Y-Zeolite, there are obtained the corresponding small, substantially spherical agglomerates of which, when dried, are useful as catalysts or catalyst base materials.

Example 2

A Single Solid System (a) A commercial grade of pseudo boehmite (Versal 850, Kaiser Chemicals) 100 gms, was dispersed at 3,000 rpm in 700 mls. of 1,1,2-trichloro-1,2,2-trifluoroethane in a teflon lined variable speed mixer. To this dispersion was added 2.82 gm concentrated nitric acid dissolved in 90 gms of water and mixing continued for 2 min at 3,000 rpm. The speed was then reduced to 2,000 rpm and mixing continued for an additional five minutes to obtain substantially spherical smooth agglomerates. The solvent was removed by filtration and the agglomerates were dried at 400° F. for 4 hours and calcined at 1200° F. for 1 hr in dry air. The calcined substantially spherical smooth agglomerates have diameters of 1 mm to 3 mm.

(b) 1,1,2-Trichloro-1,2,2-trifluoroethane may be substituted by other water-immiscible solvents in this preparation. Therefore, proceeding as described in Subpart (a) above of this Example but substituting volumetrically equivalent amount of pentane; pentene; cyclohexane; hexane; heptane; heptene; octane; pentane/heptane (50/50 by volume); petroleum ether, bp 30°-60° C.; petroleum ether, bp 50-80° C.; methylene chloride; chloroform; ethylene dichloride; 1,2-dibromo-1,1,2,2-tetrafluoroethane; 1-bromo-1,2-dichloro-1,2,2-difluorohexane; pentane/chloroform (50/50 by volume); or octane/1,1,2-trichloro-1,2,2-trifluoroethane (50/50 by volume) or mixtures thereof for 1,1,2-trichloro-1,2,2-trifluoroethane, there are obtained the corresponding small, substantially spherical smooth agglomerates of alumina, which, when dried, are useful as catalyst bases.

(c) The nitric acid may be substituted by other acids. Therefore, proceeding as described in Subpart (a) above of this Example but substituting a stoichiometrically equivalent amount of HClO₄; H₂SO₄; HF; HBr; HI; CF₃CO₂H or mixtures thereof for nitric acid, there are obtained the corresponding agglomerates, which, when sieved and dried, are useful as catalyst bases.

Example 3

A suspension of 10 weight percent Catapal in 1,2-dibromo-1,1,2,2-tetrafluoroethane is pumped from an agitated storage tank at 100 ml per minute, through a static mixer (Kenix quarter inch static mixer having 21 elements). Simultaneously, an aqueous solution containing 1 M nitric acid is also pumped through this mixer at 11 ml per minute. This premixes the Catapal with the aqueous phase so that the dispersion entering the high-shear mixer is of constant composition. The high-shear mixer is a high-speed laboratory blender modified for continuous operation. The vertically mounted mixing chamber is constructed from a 4-inch diameter by 5-inch long stainless steel pipe closed at both ends with ⅛-inch stainless steel plates. The bottom plate is fitted with the blender blade assembly. The feed inlet is in the side of the cylindrical wall, 0.5 inch from the plate. This arrangement ensures that the fed is injected directly into the high-shear zone in the vicinity of the rotating blade, the operating speed of which is 3000 rpm. The outlet is located in the center of the top flange and is connected to the adjacent low-speed agglomerator by a short length of quarter inch ID TEFLON tubing. The horizontally mounted low-speed agglomerator is constructed from a 4-inch diameter by 12-inch long stainless steel pipe. The ends are sealed with ⅛ in stainless steel flanges which house both shaft seals and externally mounted bearings. The impeller is a 0.5-inch diameter shaft to which is attached four sets of evenly spaced pegs, 0.25-inch diameter and 3 inches long. These pegs provide the agitation necessary for successful agglomeration. Power to the low-speed agglomerator is provided by a quarter horsepower DC motor. The speed of rotation is adjustable from 50 to 1800 rpm. With the Catapal/nitric acid system, the speed for optimum agglomeration is 300 rpm. All internal surfaces are coated with a 1-mm thick fluoropolymer coating (Fluoroshield Coatings, W. L. Gore and Associates). The inlet in the low-speed agglomerator is at the bottom of the cylindrical chamber, 1 inch from the end flange nearest the motor. The inlet diameter is 0.25 inch. The outlet for the agglomerates is at the other end of the cylindrical chamber, also 1 inch from the end flange. The outlet is a 1-inch inner diameter by 3-inch length of stainless steel tubing coated on the inside with a 0.5 mm layer of Fluoroshield. The outlet pipe is located on the upper surface of the cylindrical chamber and is inclined radially at 30 degrees from the vertical. This allows convenient discharge of the agglomerates and the organic liquid onto a coated separator screen. With this arrangement, spheroidal smooth agglomerates at 2 to 4 mm in diameter are produced on a continuous basis. After vacuum drying for 2 hours at 100° C., the agglomerates are calcined at 950° F. for 4 hours in a stream of dry air to give hardened spheres resistant to crushing and suitable as a catalyst base.

Example 4

A commercial grade of pseudoboehmite (Kaiser, Versal 250) 150 g was dispersed in 900 ml of 1,1,2-trichloro-1,2,2-trifluoroethane using a teflon lined variable speed mixer. To this dispersion was added 9.49 g of trifluoroacetic acid dissolved in 23.9 g of water. The mixing was continued for 2 minutes at 3,000 rpm. An aqueous solution of phosphomolybdic acid, 63.38 g (14.4 wt % Mo, 4.4 wt % phosphoric acid) was then added and the mixing continued for 2 minutes at 3,000 rpm. An aqueous solution of nickel nitrate, 47.58 g (7.5 wt % Ni, 1.1 wt % acetic acid) was then added and mixed for another 2 minutes at 3,000 rpm. The mixing speed was then reduced to 2,000 rpm to agglomerate the small, dispersed catalyst particles and the mixing was continued for 30 minutes. The agglomerates were separated from the solvent by screening and after drying and calcining give substantially spherical catalyst particles with 90 wt % being in the range 2.0 to 1.0 mm in diameter. These catalyst particles are suitable for hydroprocessing of petroleum fractions. An example of the spheroidal smooth shape agglomerate is shown in FIG. 2(a).

Example 5

The same type and quantity of alumina as in Example 4 was again dispersed in 900 ml of 1,1,2-trichloro-1,2,2-trifluoroethane. An aqueous solution of 7.50 g of concentrated nitric acid in 30.00 g water was then added and mixed for 2 minutes at 3,000 rpm. This amount of acid was equivalent to the number of moles of acid in Example 4. An aqueous solution of phosphomolybdic acid, 48.39 g (18 wt % Mo, 5.8 wt % phosphoric acid) was then added and the mixing continued for 2 minutes at 3,000 rpm. Finally, an aqueous solution of nickel nitrate, 42.59 g (8.4 wt % Ni, 1.3 wt % acetic acid) was added and mixed for another 2 minutes at 3,000 rpm. The mixing speed was reduced to 2,000 rpm to agglomerate the catalyst particles and the mixing continued for 15 minutes. The resulting agglomerates were substantially spherical in shape and after drying and calcining give catalyst particles with 99 wt % being in the range 2.0 to 0.5 mm in diameter.

Example 6

Using the procedure of Example 4 but substituting 13.60 g of trichloroacetic acid dissolved in 23.91 g of water for the trifluoroacetic acid (equivalent to the number of moles of acid in Example 4) and agglomerating for 15 minutes at 2,000 rpm, spheroidal polylobe agglomerates were produced. After drying and calcining, strong spheroidal polylobe catalyst particles were produced with 95 wt % being 2.0 to 0.5 mm in diameter. An example of the spheroidal polylobe shape agglomerate is shown in FIG. 2(b).

Example 7

Versal 250 alumina, 100 g, was dispersed in 900 ml of 1,1,2-trichloro-1,2,2-trifluoroethane as in Example 4. To this dispersion was added 75.16 g of aqueous phosphomolybdic acid (30.4 wt % Mo) and mixed for 2 minutes at 3,000 rpm. Aqueous nickel nitrate solution (15.9 wt % Ni, 2.4 wt % acetic acid) 75.45 g, was then added and mixed for a further 2 minutes at 3,000 rpm. The mixing speed was reduced to 600 rpm and mixing continued for 15 minutes. This gives spheroidal polylobe agglomerates which after drying and calcining give catalyst particles with 83 wt % being 2.0 to 1.0 mm in diameter.

Example 8

Example 7 was repeated with the low speed agglomeration continued for 30 minutes at 600 rpm. This gave spheroidal polylobe agglomerates which after drying and calcining gave catalyst particles with 84 wt % being 2.0 to 1.0 mm in diameter and 87 wt % being 2.0 to 0.5 mm in diameter.

Example 9

Example 7 was repeated with the low speed agglomeration continued for 60 minutes at 600 rpm. This also gave spheroidal polylobe agglomerates which after drying and calcining gave catalyst particles with 73 wt % being 2.0 to 1.0 mm in diameter and 74 wt % being 2.0 to 0.5 mm in diameter.

Examples 7 to 9 illustrate an unexpected result that the spheroidal shape which contains the polylobes is not very sensitive to agglomeration time, even though the time increased from 15 to 60 minutes. However, increasing agglomeration time changes the catalyst size distribution, with the quantity of +2.0 mm diameter particles increasing with time. Also, there is a concomitant increase in the strength of the catalyst particles with increasing agglomeration time.

Table 2 summarizes the size distribution and crush strength data for Examples 13 to 15.

TABLE 2

| Effect of Agglomeration Time on Catalyst Properties | | | |
|---|---|---|---|
| Agglomeration Time, minutes | 15 | 30 | 60 |
| Agglomeration Speed, rpm | 600 | 600 | 600 |
| Wt % + 2 mm diameter | 3 | 12.7 | 26.0 |
| Wt % 2-1 mm diameter | 83.4 | 84.2 | 72.9 |
| Wt % 1-0.5 mm diameter | 13.5 | 3.1 | 1.2 |
| Wt % -0.5 mm diameter | 0.1 | 0.0 | 0.0 |
| Crush Strength, Kg/cm[(1)] | 7 | 9 | 14 |

[(1)]Carried out on 2.0 to 1.0 mm diameter particles.
Note - Catalyst has 9.0 wt % Ni, 20.4 wt % Mo, 0.58 wt % P.

While only a few embodiments of the invention have been shown and described herein, it will become apparent to those skilled in the art that various modifications and changes can be made in the process to prepare small spheroidal agglomerates which may be useful as catalysts and/or catalyst base materials without departing from the spirit and scope of the present invention. All such modifications and changes coming within the scope of the appended claims are intended to be covered thereby.

What is claimed is:

1. A spheroidal agglomerate body having a polylobed external surface comprising a multiplicity of closely packed contiguous, substantially spherical agglomerates formed from micron-sized inorganic solid particles, said substantially spherical agglomerates each having a diameter ranging from about 0.05 mm to 0.2 mm, and said substantially spherical agglomerates being fused together at their areas of contact to form the resultant spheroidal polylobe agglomerate body with overall diameter of 0.5 mm or greater.

2. A spheroidal agglomerate body in accordance with claim 1 wherein said micron-sized inorganic solid particles are selected from the group consisting of alumina, silica, zeolites and mixtures thereof.

3. A spheroidal agglomerate body in accordance with claim 2 wherein said micron-sized inorganic solid particles are alumina.

4. A spheroidal polylobe agglomerate body in accordance with claim 2 wherein said micron-sized inorganic solid particles are zeolites.

5. A spheroidal agglomerate body in accordance with claim 2 wherein said micron-sized inorganic solid particles are silica.

6. A spheroidal polylobe agglomerate body in accordance with claim 1 having an overall diameter of from 1 mm to 5 mm.

7. A spheroidal polylobe agglomerate body in accordance with claim 1 having an overall diameter of from of from 1 mm to 2 mm.

8. A spheroidal polylobe agglomerate body in accordance with claim 1 having an overall diameter of from 2 mm to 5 mm.

* * * * *